US012575540B2

(12) United States Patent
Vogel

(10) Patent No.: US 12,575,540 B2
(45) Date of Patent: Mar. 17, 2026

(54) FEED LIFT FOR PET FEEDING

(71) Applicant: VOGEL UND WEBER GMBH PRODUKTION UND VERTRIEB, Aachen (DE)

(72) Inventor: Jürgen Vogel, Aachen (DE)

(73) Assignee: VOGEL UND WEBER GMBH PRODUKTION UND VERTRIEB, Aachen (DE)

( * ) Notice: Subject to any disclaimer, the term of this patent is extended or adjusted under 35 U.S.C. 154(b) by 0 days.

(21) Appl. No.: 18/698,969

(22) PCT Filed: Oct. 6, 2022

(86) PCT No.: PCT/EP2022/077860
§ 371 (c)(1),
(2) Date: Sep. 3, 2024

(87) PCT Pub. No.: WO2023/061855
PCT Pub. Date: Apr. 20, 2023

(65) Prior Publication Data
US 2024/0407328 A1 Dec. 12, 2024

(30) Foreign Application Priority Data
Oct. 15, 2021 (DE) ..................... 10 2021 126 790.0

(51) Int. Cl.
*A01K 5/01* (2006.01)
*A01K 5/02* (2006.01)

(52) U.S. Cl.
CPC .............. *A01K 5/0114* (2013.01); *A01K 5/02* (2013.01)

(58) Field of Classification Search
CPC ................................ A01K 5/0114; A01K 5/02
See application file for complete search history.

(56) References Cited

U.S. PATENT DOCUMENTS

| | | | |
|---|---|---|---|
| 5,054,431 A | 10/1991 | Coviello | |
| 5,584,263 A | 12/1996 | Sexton | |
| 8,776,725 B1 | 7/2014 | Grijalva | |
| 9,144,225 B1 * | 9/2015 | Gaccione | A01K 5/0114 |
| 10,149,456 B2 * | 12/2018 | Diamond | A01K 5/0114 |
| 10,524,451 B1 * | 1/2020 | Sciortino | A01K 5/0114 |
| 11,013,213 B1 | 5/2021 | Gelinas | |
| 2006/0288946 A1 * | 12/2006 | Brillon | A01K 5/0114 |
| | | | 119/61.56 |

(Continued)

OTHER PUBLICATIONS

Notification of Transmittal of English Translation of the International Preliminary Report on Patentability, Issuance Date Apr. 16, 2024, 8 Pages.

*Primary Examiner* — Jessica B Wong
(74) *Attorney, Agent, or Firm* — LUCAS & MERCANTI, LLP

(57) ABSTRACT

A feed lift for pet food includes a platform that is configured to receive feeding bowls and can be moved in the vertical direction. A drive moves the platform along two stationary guide elements that extend vertically upward from a base. Drive forces are introduced to the platform by a toothed belt at lateral edges of the platform. The toothed belt is driven by a central motor and avoids misalignments of the platform, tilting, and uneven running. The toothed belt allows precise control of the platform and the location of the motor in the base improves stability of the feed lift.

12 Claims, 4 Drawing Sheets

(56)        References Cited

U.S. PATENT DOCUMENTS

2015/0313176 A1 *  11/2015  Gelinas ................ A01K 29/00
                                             119/51.5
2016/0316715 A1     11/2016  Diamond
2019/0090452 A1      3/2019  Grijalva
2024/0425333 A1 *  12/2024  Blickle ............... A01K 11/006

* cited by examiner

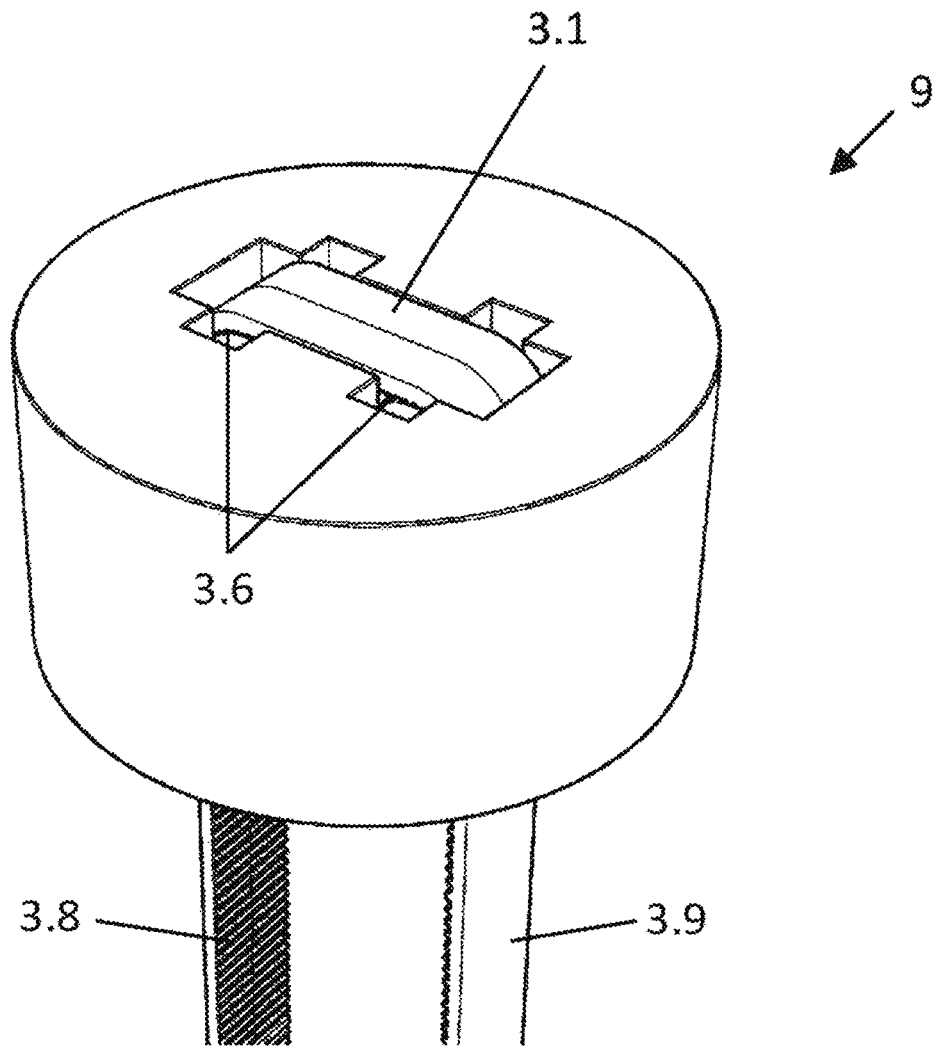
Figure 3

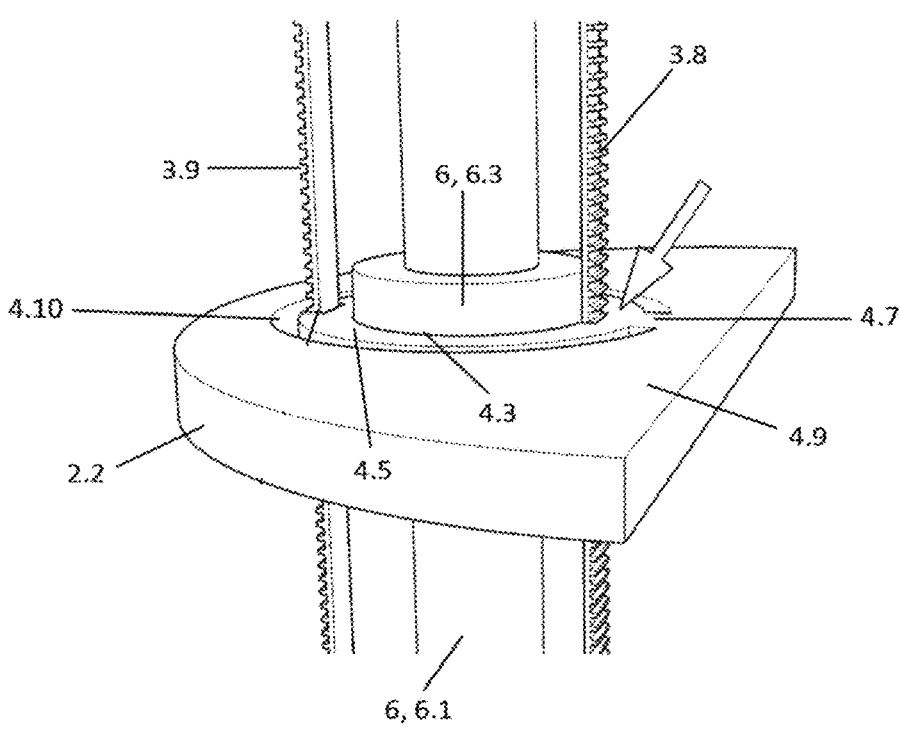
Figure 4 a)
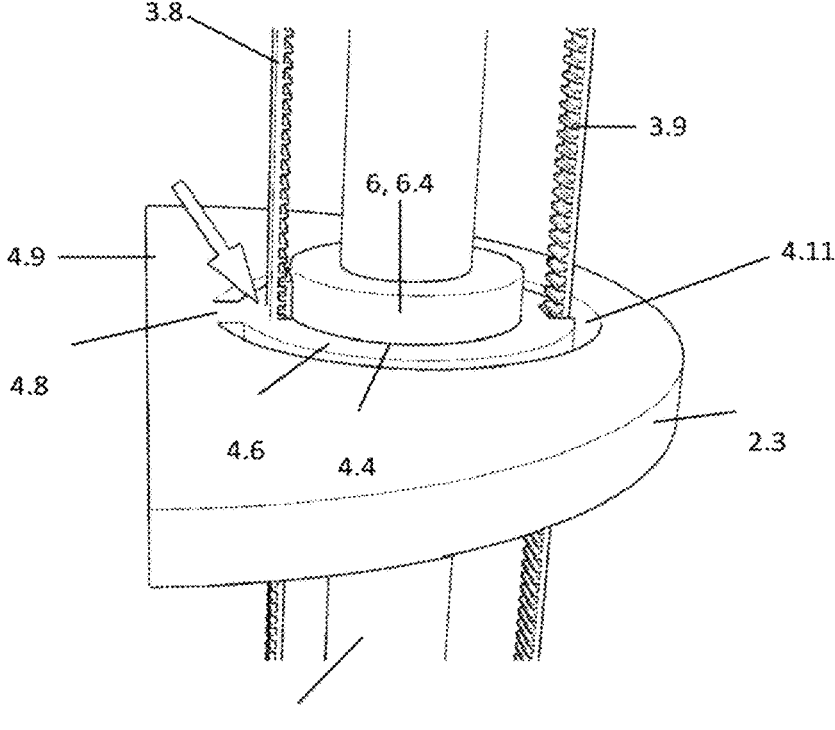
Figure 4 b)

FEED LIFT FOR PET FEEDING

CROSS-REFERENCE TO RELATED APPLICATIONS

This application is a 371 of PCT/EP2022/077860, filed Oct. 6, 2022, which in turn claims the priority of DE 10 2021 126 790.0 filed Oct. 15, 2021. The priority of each of these applications is hereby claimed and these applications are incorporated herein by reference.

BACKGROUND OF THE INVENTION

The invention relates to a feed lift for pets, having a platform that can be moved in the vertical direction for receiving feeding bowls, and a drive for moving the platform.

U.S. Pat. No. 8,776,725 B1 has disclosed a feed lift which comprises a base on which a vertically oriented central column is arranged. The platform is guided and movable along this column.

U.S. Pat. No. 5,584,263 B1 discloses a feed lift having two vertical hollow guides in which respective synchronously running chains circulate in order to move a platform for receiving feeding bowls in the vertical direction. The drive is located in a housing on the upper side of the two vertical guides.

US 2019/090452 A1 discloses a feed lift having a platform that can be moved along a central vertical guide for receiving feeding bowls, comprising a drive arranged at the upper end of the vertical guide for moving the platform. The drive comprises a hand-operated spool onto which a cable connected to the platform is wound.

U.S. Pat. No. 5,054,431 discloses a platform guided along two vertical supports for receiving feeding bowls. The platform is driven on one side via a circulating toothed belt. The toothed belt is deflected over gear wheels on the under and upper side. The drive motor is arranged on the upper side of the feed lift.

US 2016/316715 A1 discloses a feed lift having two vertical supports which guide a platform for receiving the feeding bowls in the vertical direction. Arranged on the upper side of the two vertical guides, in an upper console, is a motor with a spool, onto which two cables each attached laterally to the platform are wound. The cables are guided freely beside the vertical supports and are attached to the two narrow sides of the platform. The necessarily required arrangement of the drive on the upper side of the feed lift is disadvantageous, reduces its stability and the risk of non-uniform winding of the cables onto the spool, which can lead to misalignment and non-uniform running of the platform.

U.S. Pat. No. 11,013,213 B1 discloses a feed dispenser for pets having two containers for receiving and storing pet food and/or water, with a container mount that can be moved in the vertical direction for receiving the two containers, and a drive for moving the container mount, wherein the drive has a belt mechanism with belts circulating between a drive belt pulley and a second pulley, wherein the drive belt pulley is driven by a motor.

BRIEF SUMMARY OF THE INVENTION

Starting from this prior art, the invention is based on the object of devising a feed lift with an improved drive concept, which increases the stability of the feed lift and at the same time avoids misalignments, tilting and non-uniform running during both the upward and the downward movement of the platform. In particular, spilling of the content in the feeding bowls is to be avoided on the basis of the improved drive concept.

In the feed lift of the type mentioned at the beginning, this object is achieved in that the drive has a belt mechanism with a circulating toothed belt and a drive pinion driven by a motor, the motor and the drive pinion are arranged in a base (2) of the feed lift, the drive pinion meshes with the circulating toothed belt, a linear guide has two stationary guide elements extending vertically upward from the base and a respective guide element movable along each of the two stationary guide elements, wherein the two movable guide elements are fastened laterally to the platform, deflection means for the circulating toothed belt are arranged in the base of the feed lift and on an upper side of the two stationary guide elements in such a way that the toothed belt circulates along the two stationary guide elements, in each case in runs with an opposite running direction, and the platform is fastened to runs of the circulating toothed belt moving in the same direction along the two stationary guide elements.

Significant advantages of the invention as compared with the known drive concepts consist in improved stability because of the arrangement of the motor in the base, the improved linear guidance by means of the two stationary guide elements extending vertically upward from the base and the uniform introduction of the drive forces into the platform at its lateral edges by using a single circulating drive means in the form of a toothed belt which is driven by a central motor, by which means misalignments of the platform, tilting and uneven running are avoided. The single circulating toothed belt not only permits the transmission of the drive forces but, in addition, precise control of the platform. Further advantages of the toothed belt are the low noise, the long service life, being largely maintenance-free, and low elongation.

Deflection means, for example in the form of deflection rollers or belt pulleys, for the circulating toothed belt, are arranged in the base of the feed lift, preferably formed as a housing, and on an upper side of the two stationary guide elements, in such a way that the toothed belt circulates along the two stationary guide elements, in each case in runs with an opposed running direction. Part of the toothed belt of the belt drive that exerts the circulating tensile force is designated as a run. The toothed belt runs along each of the two stationary, vertical guide elements in runs with an opposed running direction, i.e. while the toothed belt runs upward in one run, it runs downward in the other run via the deflection means arranged on the upper side of the stationary guide element.

The elongate, preferably oval, platform is fastened at its lateral edges to runs of the circulating toothed belt moving in the same direction along the two stationary guide elements.

Because of the extensive freedom from play and the damping properties, the linear guide is preferably designed as a sliding guide, which has two stationary guide shafts extending vertically upward from the base and a respective sliding bearing moving along each guide shaft. The stationary guide shafts are, for example, fixed to the base in a stationary manner as cylindrical guide rods. The sliding bearings are designed as sliding bushes with a circular cross section.

The two sliding bearings are preferably each fastened in an aperture arranged laterally on the platform. The fastening in the aperture is carried out in particular with an oversize fit or press fit. Alternatively or additionally, the fastening can be carried out integrally by bonding the sliding bearing adhesively in the aperture.

The movable guide element, designed as a sliding bearing, can, however, also be designed as an integral constituent part of the platform, for example by means of a hole in the platform matched in diameter to the cylindrical guide rods. The lateral surface of the aperture can be coated with a material reducing the friction with respect to the guide rod.

In an advantageous refinement of the invention, the aperture for fastening the sliding bearing is a constituent part of an annular receiving portion of the platform, which is connected to the remaining part of the platform only via a narrow web.

The guide elements of the linear guide and the circulating toothed belt can be housed visually attractively by means of a sleeve, in which the receiving portion is connected to the remaining part of the platform via the web, forming an annular gap partly surrounding the receiving section, and the sleeve extends with a longitudinal slot configured for a passage of the web through the annular gap over the length of the stationary guide shaft. The slot width of the longitudinal slot is slightly greater than the web width, in order to avoid unnecessary friction between the web and the slot during the movement of the platform. The housing by means of the sleeve protects the drive components and guide elements against soiling and damage. Furthermore, the housing is used to protect the user of the feed lift.

In an expedient refinement of the invention, the platform can be fastened without additional fastening elements to the runs of the circulating toothed belt moving in the same direction, in each case by clamping the run between the sliding bearing and the aperture arranged laterally on the platform. If the two ends of the circulating toothed belt are not welded to each other at the contact point, the overlapping ends can be connected to each other and fastened to the platform by clamping between the sliding bearing and the aperture. For stabilization, in particular of the two stationary guide elements, the feed lift has a central support oriented in the vertical direction, to which an upper frame part extending horizontally, configured to support the stationary guide elements at their upper end, is fastened. The anchor points of the stationary guide elements and of the central support to the base and to the frame part in each case form a triangle.

The toothed belt can have a clamping device, which maintains the necessary tension in the event of lengthening of the toothed belt.

In one refinement of the invention, the platform has at least one receptacle for the form-fitting fixing of vessels. The vessels are fixed in the receiving plate, for example, by means of a bayonet fixture.

The drive can have a safety shutdown, which is set up in such a way that the movement of the platform is interrupted under defined load conditions, in order to avoid damage caused by the feed lift. The safety shutdown can be carried out electrically and/or mechanically.

If the drive has a motor controller which controls the acceleration phases, i.e. starting up and braking the platform, spilling of container contents can reliably be avoided.

For safety reasons, the drive and the electronics are operated with low voltages (12 volts).

In one refinement of the invention, contacts can be arranged on the base which, when a drinking vessel is inserted into the platform, activate a circulating pump for the water in the drinking vessel.

For hygienic reasons, all the operating elements are encapsulated and/or designed as non-contact switching elements.

The invention is explained in more detail below with reference to an exemplary embodiment.

BRIEF DESCRIPTION OF THE DRAWINGS

In the figures:

FIG. 3 shows a detailed illustration of a deflection means on a top part, FIG. 4a shows a detailed illustration of the left-hand lateral edge of a vertically movable platform of the feed lift, and FIG. 4b shows a detailed illustration of the right-hand lateral edge of a vertically movable platform of the feed lift.

DETAILED DESCRIPTION OF THE PREFERRED EMBODIMENTS

Figure 1:
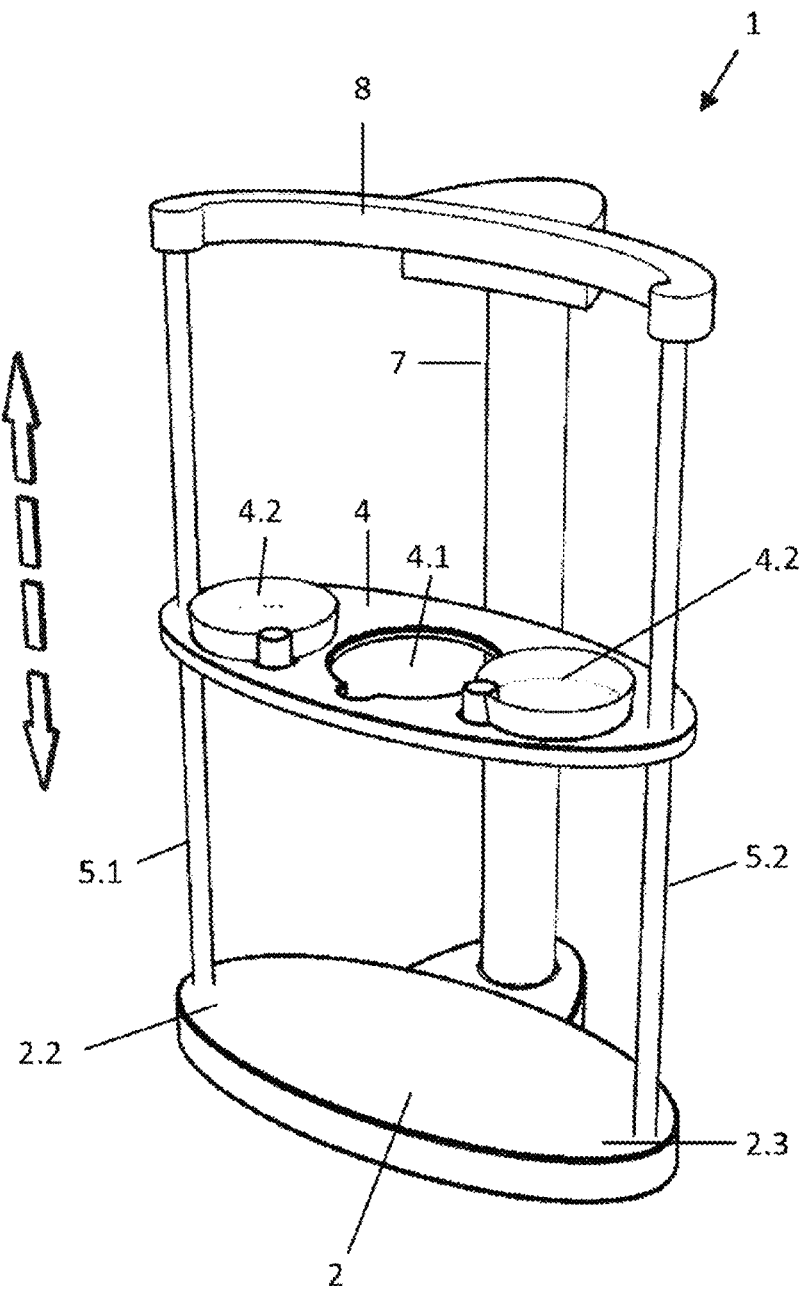
FIG. 1 shows a perspective overall view of a feed lift according to the invention.

The feed lift 1 for pets comprises a base 2 for receiving a drive for a movable platform 4. The platform 4 has a plurality of openings 4.1 for receiving vessels 4.2 in a form-fitting manner. The vessels 4.2 are used, for example, to hold water or feed for pets.

Contacts 2.4 are arranged on the base which, when a drinking vessel 4.2 inserted in the platform 4 is placed on the contacts 2.4, activate a circulating pump 4.12 for water in the drinking vessel.

From the base 2, two sleeves 5.1, 5.2 extend upward at the sides, in which the elements of a linear guide 6, which is designed substantially as an elongate, in particular oval, plate, for the platform 4 that is movable in the vertical direction are arranged.

In addition, the feed lift 1 has a central support 7 fastened to a rear portion 2.1 of the base 2 between the sleeves 5.1, 5.2 and to which an upper frame part 8 is fastened. The base 2, the central support 7 and the frame part 8 together form the frame of the feed lift 1 for the stationary guide elements 6.1, 6.2, extending upward in the vertical direction within the sleeves 5.1, 5.2, of the linear guide 6 (cf. FIGS. 4a), 4b) with the sleeves 5.1), 5.2) not shown).

The linear guide 6 additionally has two movable guide elements 6.3, 6.4, wherein the movable guide element 6.3 is movable along the guide element 6.1 fixed to the frame and arranged on the left, and the movable guide element 6.4 is movable along the guide element 6.2 fixed to the frame and arranged on the right.

In the exemplary embodiment illustrated, the linear guide 6 is designed as a sliding guide, in which the guide elements 6.1, 6.2 fixed to the frame are designed as guide shafts or guide rods, and the movable guide elements are each designed as sliding bearings or sliding bushes.

The sliding bearing 6.3 is fastened with an oversize fit in an aperture 4.3 arranged laterally on the left-hand side of the platform 4 (cf. FIG. 4a)), while the sliding bearing 6.4 is fastened with an oversize fit in an aperture 4.4 arranged laterally on the right-hand side of the platform 4. In addition, it can be seen from FIGS. 4*a*), 4*b*) that each aperture 4.3, 4.4 is a constituent part of an annular receiving portion 4.5, 4.6 of the platform 4. The two annular receiving portions 4.5, 4.6 are each connected to the remaining part 4.9 of the platform 4 via a web 4.7, 4.8, forming an annular gap 4.10, 4.11 partly surrounding the receiving portion 4.5, 4.6. The sleeve 5.1, not illustrated in FIG. 4*a*), is provided with a longitudinal slot 5.3 configured for a passage of the web 4.7, and the sleeve 5.2 is provided with a longitudinal slot 5.4 configured for a passage of the web 4.8 (cf. FIG. 2), the two longitudinal slots 5.3, 5.4 extending over the length of the stationary guide elements 6.1, 6.2.

Figure 2:
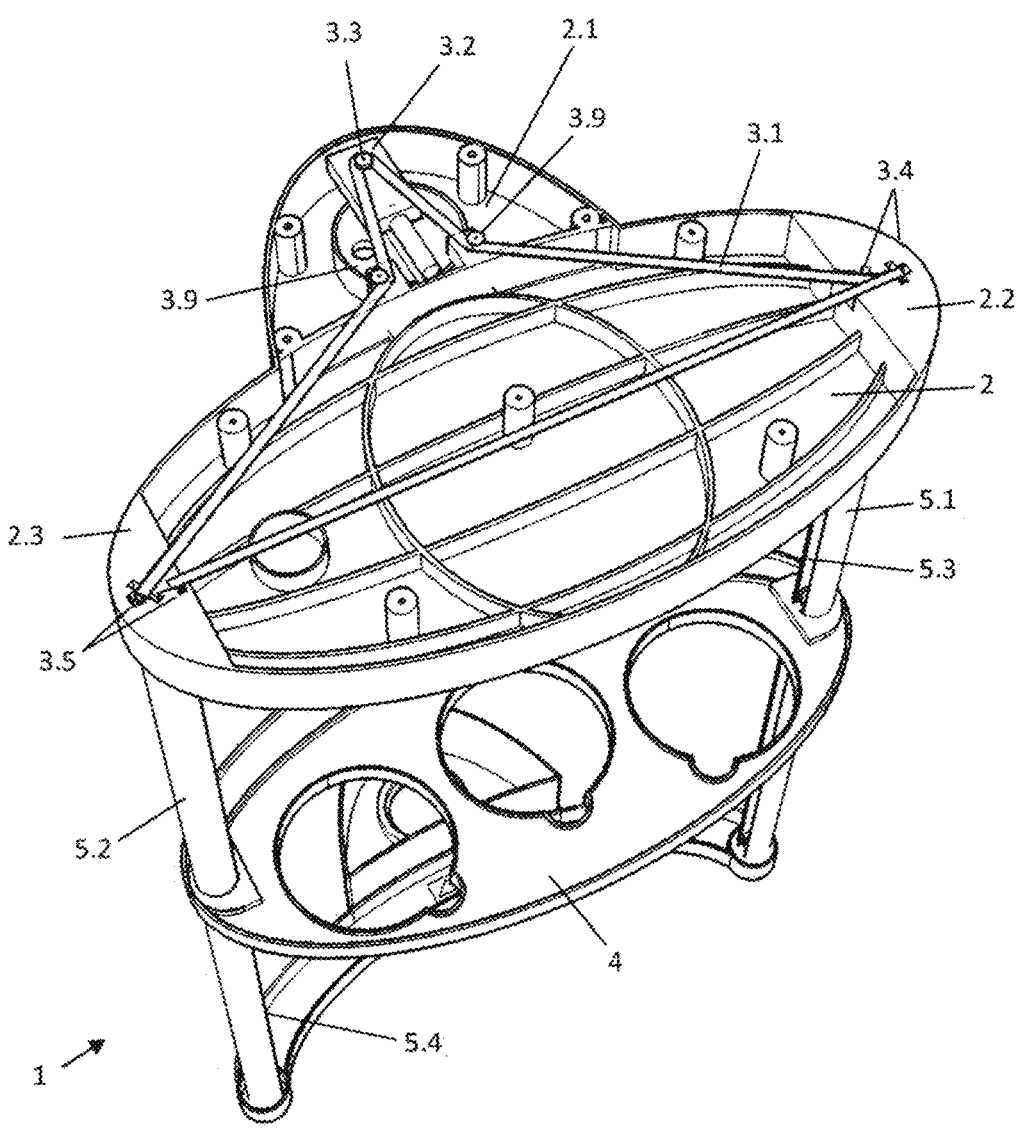
FIG. 2 shows a perspective overall view of the feed lift according to FIG. 1 from the underside with the base opened to illustrate the drive concept.

The drive, which can in particular be seen from FIG. 2, comprises a belt mechanism with a circulating toothed belt 3.1 and a drive pinion 3.3 driven by a motor 3.2. The motor 3.2 and the drive pinion 3.3 are accommodated in the base 2 designed as a housing. Two deflection means 3.4 are arranged in the reinforced left-hand lateral edge region 2.2 of the base 2, and two deflection means 3.5 are arranged in the reinforced right-hand lateral edge region 2.3 of the base 2. The four deflection means 3.4, 3.5 are all designed as deflection rollers rotatable about a shaft. They are arranged in the lateral edge regions 2.2, 2.3 of the base 2 in such a way that the toothed belt 3.1 circulates along the two stationary guide elements 6.1, 6.2, in each case in runs 3.8, 3.9 having an opposed running direction (cf. FIGS. 4*a*, 4*b*). The deflection means 3.4 are arranged on the base 2 in the region of the anchoring point of the left-hand stationary guide element 6.1, and the deflection means 3.5 are arranged on the base 2 in the region of the anchoring point of right-hand stationary guide element 6.2. The circulating toothed belt 3.1 passes into the sleeve 5.1 and out of the sleeve 5.1 in the interior of the base 2 formed as a housing through openings, not illustrated, in the left-hand lateral edge region 2.2 of the base 2. The circulating toothed belt 3.1 passes into the sleeve 5.2 and out of the sleeve 5.2 in the interior of the base 2 formed as a housing through openings, not illustrated, in the right-hand lateral edge region 2.3 of the base 2.

Further deflection means 3.6 are arranged on the upper side of each of the two stationary guide elements 6.1, 6.2 (cf. FIG. 3) in order to deflect the toothed belt 3.1 from one running direction into the opposite running direction, in each case at the upper end of the guide element 6.1, 6.2. The deflection means 3.6 are designed as deflection rollers. The deflection rollers are each mounted in a top part 9, illustrated in FIG. 3, that can be placed in a form-fitting manner on the stationary guide element 6.1, 6.2 and the surrounding sleeve 5.1, 5.2. The deflection rollers 3.6 are rotatably mounted in the top part 9. The distance between the two deflection rollers 3.6 is chosen in such a way that the runs 3.8, 3.9 running in opposite directions via passages in the top part 9 circulate at a distance from the stationary guide element 6.1, 6.2 (cf. FIG. 4*a*), 4*b*)). The two top parts 9 are connected to each other by the frame part 8 on the top parts.

The platform 4 is fastened to the runs 3.8 of the toothed belt 3.1 moving in the same direction along the two stationary guide elements 6.1, 6.2. The nature and manner of the fastening can be seen at best from FIGS. 4*a*, 4*b*. The fastening to the runs 3.8 of the circulating toothed belt 3.1 moving in the same direction is carried out without additional fastening means by clamping the run 3.8 between the sliding bearing 6.3 and the passage 4.3 on the left-hand side of the platform 4, and by clamping the run 3.8 between the sliding bearing 6.4 and the passage 4.4 on the right-hand side of the platform 4. In the exemplary embodiment illustrated, the two ends of the circulating toothed belt 3.1 are not welded to each other at the contact point. For this reason, on the right-hand side of the platform 4, the overlapping ends of the toothed belt 3.1 are connected to each other by clamping between the sliding bearing 6.4 and the aperture 4.4 and, at the same time, are fixed to the platform 4. It can also be seen that the toothing systems engage in each other at the two ends. A clamping device 2.5 maintains necessary tension in the event of lengthening of the toothed belt 3.1.

A controller 3.10 (shown schematically in FIG. 2) controls acceleration phases so that spilling of contents of the vessels 4.2 is avoided. The controller 3.10 may also include a safety shutdown to interrupt the movement of the platform 4 under defined load conditions.

By activating the electric motor 3.2 in one or the other direction of rotation, the platform 4 can be moved in the direction of the double arrow in FIG. 1, uniformly and without misalignments or tilting, with the aid of the linear guide 6 and the drive concept described. At the same time, the stability of the feed lift 1 is improved by arranging the essential drive components in the base 2.

LIST OF DESIGNATIONS

1 Feed lift
2 Base
2.1 Rear portion
2.2 Lateral edge region
2.3 Lateral edge region
3.1 Toothed belt
3.2 Motor
3.3 Drive pinion
3.4 Deflection means (base)
3.5 Deflection means (base)
3.6 Deflection means top part
3.8 Run
3.9 Run
4 Platform
4.1 Openings
4.2 Vessels
4.3 Aperture
4.4 Aperture
4.5 Receiving portion
4.6 Receiving portion
4.7 Web
4.8 Web
4.9 Remaining part of the platform
4.10 Annular gap
4.11 Annular gap
5.1 Sleeve
5.2 Sleeve
5.3 Longitudinal slot
5.4 Longitudinal slot
6 Linear guide
6.1 Stationary guide element
6.2 Stationary guide element
6.3 Movable guide element
6.4 Movable guide element
7 Central support
8 Frame part
9 Top part

The invention claimed is:

1. A feed lift for pet food, comprising:
a base;
a platform that is movable in a vertical direction relative to the base and is configured to receive pet feeding vessels;
a linear guide having two stationary guide elements extending vertically upward from the base and respective movable guide elements movable along the two stationary guide elements, the movable guide elements being fastened laterally to the platform;

a drive for moving the platform, the drive having a belt mechanism with a single circulating toothed belt, a central motor, and a drive pinion driven by the central motor, the single circulating toothed belt being driven by the central motor, and the central motor and the drive pinion being arranged in the base; and deflectors for the single circulating toothed belt arranged in the base and upper sides of the two stationary guide elements in such a way that, the single circulating toothed belt circulates in runs with opposite running directions along each of the two stationary guide elements, and wherein the platform is fastened to two of the runs of the single circulating toothed belt moving in the same direction along the two stationary guide elements.

2. The feed lift of claim 1, wherein the two stationary guide elements include two stationary guide shafts extending vertically upward from the base and the movable guide elements include sliding bearings movable along the two stationary guide shafts.

3. The feed lift of claim 2, wherein the slide bearings are fastened in respective apertures arranged laterally on the platform.

4. The feed lift of claim 3, wherein the apertures are arranged in annular receiving portions of the platform, the annular receiving portions are connected to a remaining portion of the platform via a web.

5. The feed lift of claim 4, wherein the remaining portion of the platform forms an annular gap partly surrounding each of the annular receiving portions, and a sleeve having a longitudinal slot configured to allow passage of the web extends through the annular gap and extends over a length of each of the stationary guide shafts.

6. The feed lift of claim 4, wherein the platform is fastened to each of the two of runs by clamping the each of the two runs between one of the sliding bearings and one of the annular receiving portions.

7. The feed lift of claim 1, wherein the toothed belt has a clamping device configured to maintain the necessary tension in response to lengthening of the toothed belt.

8. The feed lift of claim 1, wherein the platform includes at least one receptacle for form-fitting fixing of a vessel of the pet feeding vessels.

9. The feed lift of claim 1, wherein the drive has a safety shutdown configured to interrupt movement of the platform in response to defined load conditions.

10. The feed lift of claim 1, wherein the drive includes a motor controller that controls acceleration phases.

11. The feed lift of claim 1, wherein the base includes contacts that, when a drinking vessel inserted into the platform is placed on the contacts, activate a circulating pump for water located in the drinking vessel.

12. The feed lift of claim 1, further comprising a central support and an upper frame part fastened to the central support, the upper frame part supporting upper ends of the stationary guide elements.

* * * * *